(12) United States Patent
Ifergan

(10) Patent No.: US 6,820,976 B2
(45) Date of Patent: Nov. 23, 2004

(54) EYEGLASS WITH FLIP-UP AUXILIARY LENS ASSEMBLY

(75) Inventor: Thierry Ifergan, Aventura, FL (US)

(73) Assignee: Chic Optic Inc., Quebec (CA)

( * ) Notice: Subject to any disclaimer, the term of this patent is extended or adjusted under 35 U.S.C. 154(b) by 0 days.

(21) Appl. No.: 10/394,651

(22) Filed: Mar. 24, 2003

(65) Prior Publication Data

US 2004/0027534 A1 Feb. 12, 2004

Related U.S. Application Data

(60) Provisional application No. 60/366,247, filed on Mar. 22, 2002.

(51) Int. Cl.[7] .................................................. G02C 9/00
(52) U.S. Cl. .......................................... 351/47; 351/57
(58) Field of Search .............................. 351/47, 57, 44, 351/41, 158, 48, 58

(56) References Cited

U.S. PATENT DOCUMENTS

| | | |
|---|---|---|
| 1,679,233 A | 7/1928 | Strauss |
| 2,737,847 A | 3/1956 | Tesauro |
| 2,770,168 A | 11/1956 | Tesauro |
| 3,498,701 A | 3/1970 | Miller |
| 3,531,188 A | 9/1970 | Leblanc |
| 3,531,190 A | 9/1970 | Leblanc |
| 3,536,385 A | 10/1970 | Johnston |
| 3,565,517 A | 2/1971 | Gitlin |
| 3,582,192 A | 6/1971 | Gitlin |
| 3,838,914 A | 10/1974 | Fernandez |
| 4,070,103 A | 1/1978 | Meeker |
| 4,070,105 A | 1/1978 | Marzouk |
| 4,196,981 A | 4/1980 | Waldrop |
| 4,217,037 A | 8/1980 | Lemelson |
| 4,547,909 A | 10/1985 | Bell |
| 4,988,181 A | 1/1991 | Riach, Jr. |
| 5,181,051 A | 1/1993 | Townsend |
| 5,243,366 A | 9/1993 | Blevins |
| 5,321,442 A | 6/1994 | Albanese |
| 5,389,981 A | 2/1995 | Riach, Jr. |
| 5,410,763 A | 5/1995 | Bolle |
| 5,416,537 A | 5/1995 | Sadler |
| 5,568,207 A | 10/1996 | Chao |
| 5,642,177 A | 6/1997 | Nishioka |
| 5,682,222 A | 10/1997 | Chao |
| 5,696,571 A | 12/1997 | Spencer |
| 5,737,054 A | 4/1998 | Chao |
| 5,786,880 A | 7/1998 | Chao |
| 5,805,259 A | 9/1998 | Chao |
| 5,877,838 A | 3/1999 | Chao |
| 5,882,101 A | 3/1999 | Chao |
| 5,883,688 A | 3/1999 | Chao |
| 5,883,689 A | 3/1999 | Chao |
| 5,889,575 A | 3/1999 | Wang |
| 5,929,964 A | 7/1999 | Chao |
| 5,975,691 A | 11/1999 | Ku |
| 6,012,811 A | 1/2000 | Chao et al. |
| 6,092,896 A | 7/2000 | Chao et al. |
| 6,109,747 A | 8/2000 | Chao |
| 6,116,730 A | 9/2000 | Kwok |

(List continued on next page.)

FOREIGN PATENT DOCUMENTS

| | | |
|---|---|---|
| CA | 2180714 | 12/1997 |
| CA | 2313976 | 4/1998 |

(List continued on next page.)

Primary Examiner—Hung Xuan Dang

(57) ABSTRACT

Eyeglasses comprise a pair of spectacles having primary lenses and an auxiliary lens assembly attached to the spectacles. The auxiliary lens assembly is secured by a pair of arms having magnets at one end that co-operate with magnets provided on the spectacles. A hinge is provided at the opposite end o f the arms that allow the auxiliary lens assembly to move from a position in which the primary lenses are covered to a position in which they are exposed.

41 Claims, 6 Drawing Sheets

U.S. PATENT DOCUMENTS

| | | | |
|---|---|---|---|
| 6,132,040 A | 10/2000 | Xiao | |
| 6,149,269 A | 11/2000 | Madison | |
| 6,170,948 B1 | 1/2001 | Chao | |
| 6,264,323 B1 | 7/2001 | Chao | |
| 6,270,274 B1 | 8/2001 | Chao | |
| 6,305,799 B1 | 10/2001 | Chao | |
| RE37,545 E | 2/2002 | Chao | |
| 6,367,926 B1 | 4/2002 | Chao et al. | |
| 6,488,372 B1 | 12/2002 | Park | |
| 6,550,913 B2 | 4/2003 | Zelman | |
| 6,601,953 B1 * | 8/2003 | Xiao | 351/47 |
| 2001/0036170 A1 | 11/2001 | Xiao | |
| 2002/0093622 A1 | 7/2002 | Tostado | |

FOREIGN PATENT DOCUMENTS

| | | |
|---|---|---|
| CA | 2235088 | 10/1998 |
| CA | 2286765 | 10/1998 |
| CA | 2236025 | 4/1999 |
| CA | 2223295 | 7/1999 |
| CA | 2235917 | 8/1999 |
| CA | 2235897 | 12/1999 |
| CA | 2274221 | 12/1999 |
| CA | 2292390 | 4/2000 |
| CA | 2269373 | 5/2000 |
| CA | 2235798 | 7/2000 |
| CA | 2258142 | 3/2001 |
| CA | 2235466 | 2/2002 |
| CA | 2235802 | 2/2002 |
| CA | 2235818 | 3/2002 |
| CA | 2235823 | 7/2002 |
| CA | 2216280 | 8/2002 |
| CA | 2235826 | 3/2003 |
| CH | 572222 | 1/1976 |
| CN | 107096 | 1/1989 |
| CN | 1117593 A | 2/1996 |
| CN | 274588 | 4/1996 |
| DE | 1797366 | 1/1971 |
| DE | G 85 07 761.5 U1 | 6/1985 |
| DE | G 88 06 898.6 U1 | 10/1988 |
| DE | 39 05 041 A1 | 8/1990 |
| DE | 39 19 489 A1 | 12/1990 |
| DE | 39 20 879 A1 | 1/1991 |
| DE | 39 21 987 A1 | 1/1991 |
| DE | 39 33 310 A1 | 1/1991 |
| DE | G 92 16 919.8 U1 | 4/1993 |
| DE | 43 16 698 A1 | 11/1994 |
| DE | 295 18 590 U1 | 3/1996 |
| DE | 295 16 670 U1 | 5/1996 |
| DE | 195 43 346 C1 | 1/1997 |
| EP | 0469699 A1 | 2/1992 |
| EP | 0743545 A1 | 11/1996 |
| EP | 0773463 A1 | 5/1997 |
| EP | 0848276 A1 | 6/1998 |
| EP | 0773463 B1 | 12/1998 |
| EP | 1 184 711 A1 | 8/2000 |
| FR | 0915421 | 11/1946 |
| FR | 1037755 | 9/1953 |
| FR | 1061253 | 4/1954 |
| FR | 1266652 | 6/1961 |
| FR | 2483632 | 12/1981 |
| FR | 2657436 | 7/1991 |
| GB | 846425 | 8/1960 |
| GB | 855268 | 11/1960 |
| JP | 44-15392 | 7/1969 |
| JP | 54-111841 | 9/1979 |
| JP | 54-111842 | 9/1979 |
| JP | 55-50217 | 4/1980 |
| JP | 56-29209 | 3/1981 |
| JP | 57-184910 | 11/1982 |
| JP | 61-2621 | 1/1986 |
| JP | 01-136114 | 5/1989 |
| JP | 02-109325 | 8/1990 |
| JP | 05-157997 | 6/1993 |
| JP | 05-40493 | 10/1993 |
| JP | 03-011174 | 3/1995 |
| JP | 07-128620 | 5/1995 |
| JP | 07-156856 | 5/1995 |
| JP | 08-153172 | 5/1996 |
| JP | 03-031881 | 9/1996 |
| JP | 09-105889 | 4/1997 |
| SU | 220885 | 9/1968 |
| WO | WO 90/09611 | 8/1990 |
| WO | WO 01/13163 A1 | 2/2001 |

\* cited by examiner

FIG. 13.
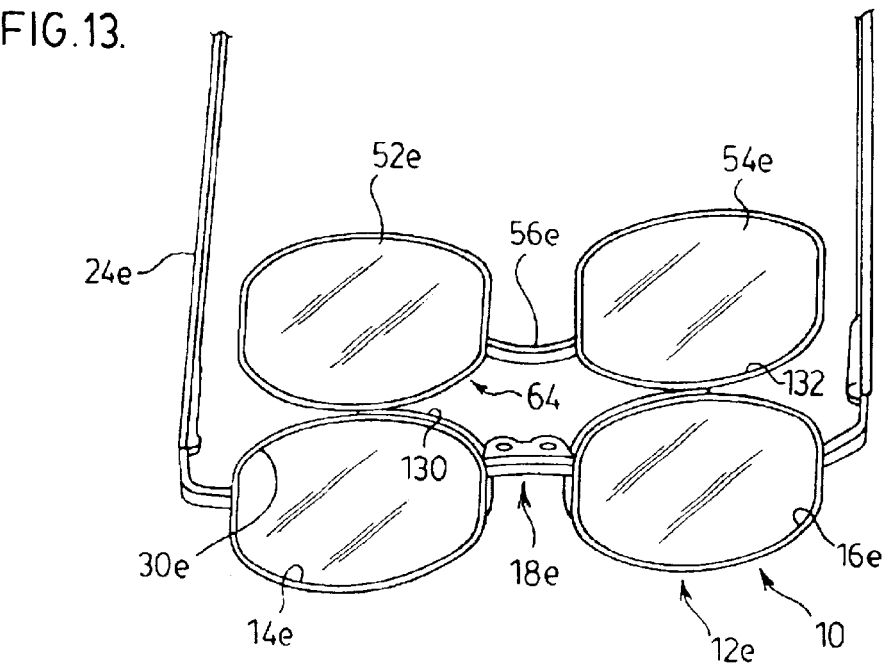
FIG. 14.
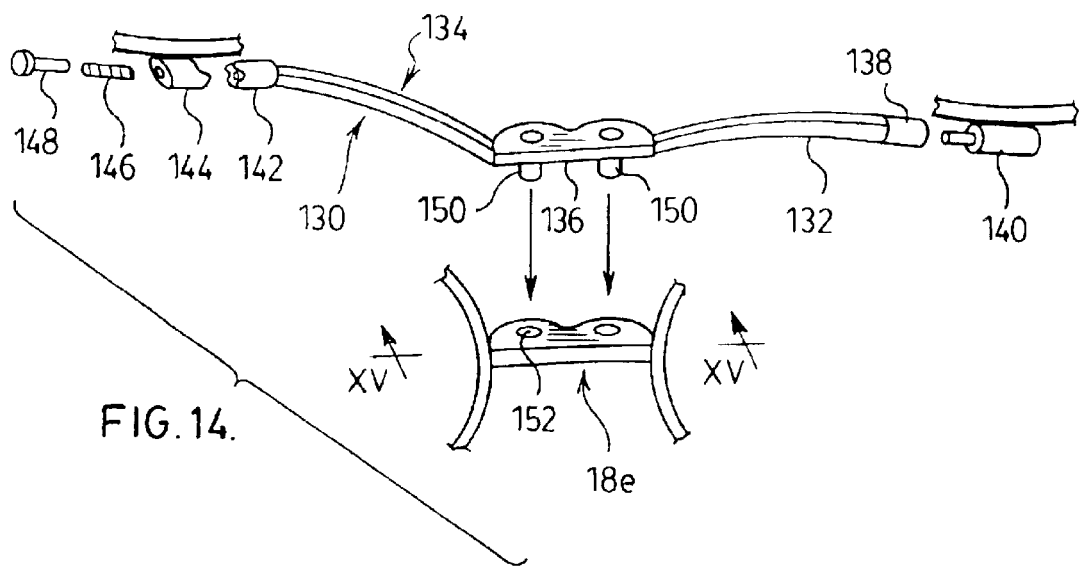
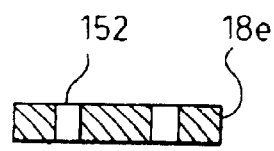
FIG. 15.

EYEGLASS WITH FLIP-UP AUXILIARY LENS ASSEMBLY

The Priority Claim is U.S. Provisional Application No. 60/366,247 filed on Mar. 22, 2002.

FIELD OF THE INVENTION

The present invention relates to eyeglasses and to auxiliary lens assemblies for use with such eyeglasses.

The use of spectacles to correct deficiencies in vision is well known. Similarly, it is well known to use auxiliary lenses with spectacles to meet certain conditions, such as extreme brightness caused by the sun. Auxiliary lenses have traditionally been secured to the spectacles by mechanical clips that engage the frame of the spectacles. More recently, as shown in U.S. Pat. No. 5,568,207, magnets have been utilised to retain the auxiliary lens assembly on the spectacle frame. Such an arrangement has made the placement or removal of such lenses more convenient then with the mechanical clips.

In some situations, such as when driving through alternate bright and dark areas, it is not convenient to fit and remove the auxiliary lens assembly with each changing condition. One prior art solution is shown is U.S. Pat. No. 3,531,188 to Leblanc in which an auxiliary lens assembly is secured by clips to the spectacle with a hinge to permit the auxiliary lens assembly to be moved between a covered and uncovered position of the primary lens. In the Leblanc patent, the auxiliary lens assembly is secured by clips that not only are difficult to assemble but also suffer the risk of damaging the surface of the primary lens. Moreover, with the auxiliary lens assembly in a position to uncover the primary lens, the retaining clips are visible and therefore unattractive.

It is therefore an object to the present invention to provide an auxiliary lens assembly and eyeglasses incorporating such as assembly obviates or mitigates the above disadvantages.

In general terms, the present invention provides an auxiliary lens assembly for use with a pair of spectacles having a pair of primary lenses. The assembly has a pair of auxiliary lenses interconnected to one another by a bridge and a pair of arms, each associated with a respective arm of the lenses. Each of the arms is connected at one end to the auxiliary lens and has a magnetic member at an opposite end for connection to a magnetic member on the spectacle and thereby locate the assembly on the spectacles. Each of the arms includes a hinge to permit movement of the assembly between a first position in which the auxiliary lenses cover the primary lenses to a second position in which they do not cover the primary lenses.

In an alternative aspect, the present invention provides eyeglasses comprising a pair of spectacles having a pair of primary lenses interconnected by a bridge and a pair of temples pivotally connected to the primary lenses for retaining the spectacles on a user. A first magnetic member is located on the spectacles. An auxiliary lens assembly has a pair of auxiliary lenses interconnected to one another by a bridge. A second magnetic member is secured to the auxiliary lens assembly and positioned to co-operate with the first magnetic member to retain the auxiliary lens assembly on the spectacles. A hinge between the spectacles and the auxiliary lens assembly permits the auxiliary lens assembly to move whilst secured to the spectacles between a first position in which the primary lenses are covered by said auxiliary lenses and a second position in which said auxiliary lenses do not cover said primary lenses.

BRIEF DESCRIPTION OF THE DRAWINGS

Embodiments of the invention will now be described by way of example only with reference to the accompanying drawings in which:

FIG. 13 is a perspective view of a further embodiment.

FIG. 14 is an enlarged view of a portion of the embodiment of FIG. 13.

FIG. 15 is a view on the line XV—XV of FIG. 14,

Figure 1:
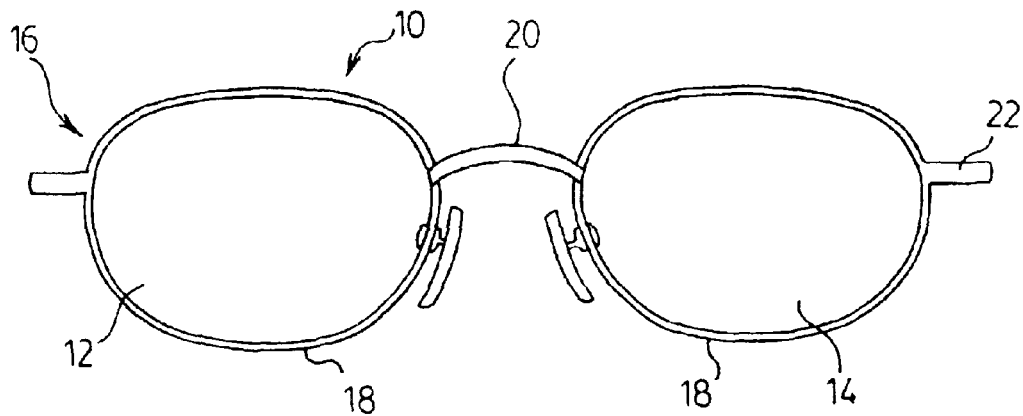
FIG. 1 is a front elevation of a pair of spectacles.
Figure 2:
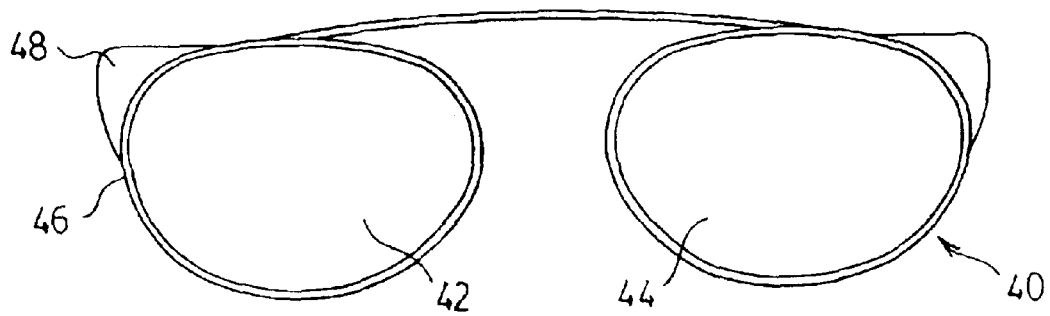
FIG. 2 is a front elevation of an auxiliary lens assembly.

Referring therefore to FIG. 1, a pair of spectacles 10 includes a pair of primary lenses located within a frame 16. The frame 16 includes a pair of lens rims 18 interconnected by a bridge 20. The frame 16 also includes hinge pedestals 22 that are connected to temples 24 by a hinge pin 26. The temples 24 extend rewardly along the sides of the users head and secure the spectacles in a well known manner.

Figure 3:
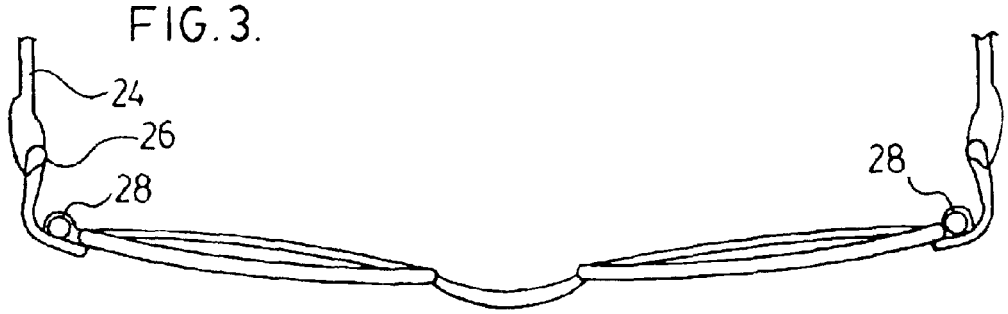
FIG. 3 is a plan view of the spectacle shown in FIG. 1.
Figure 4:
FIG. 4 is a plan view of the auxiliary lens assembly shown in FIG. 2.
Figure 5:
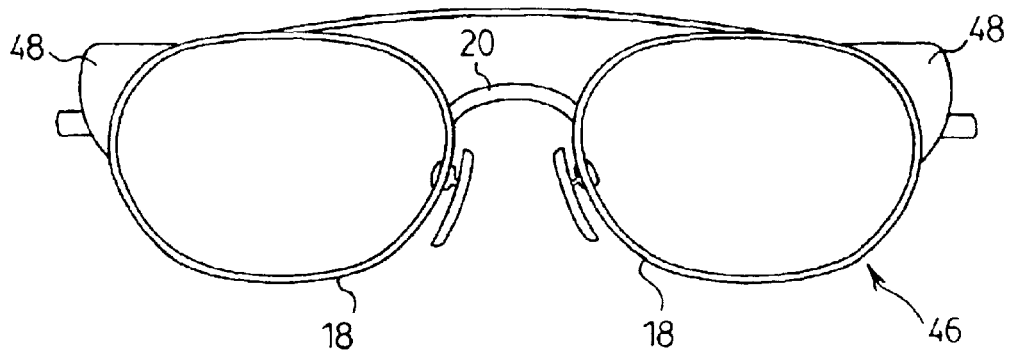
FIG. 5 is a front elevation of the eyeglasses formed from a combination of the spectacles of FIG. 1 and the auxiliary lens assembly of FIG. 2.
Figure 6:
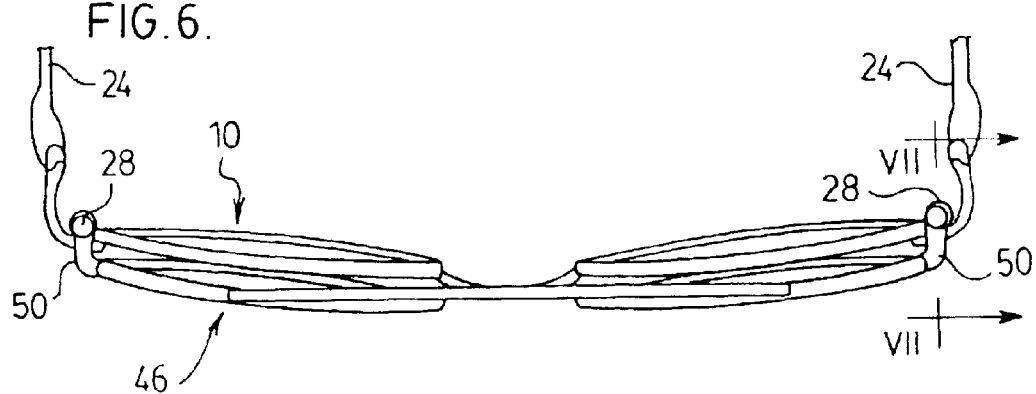
FIG. 6 is a plan view of FIG. 5.
Figure 7:
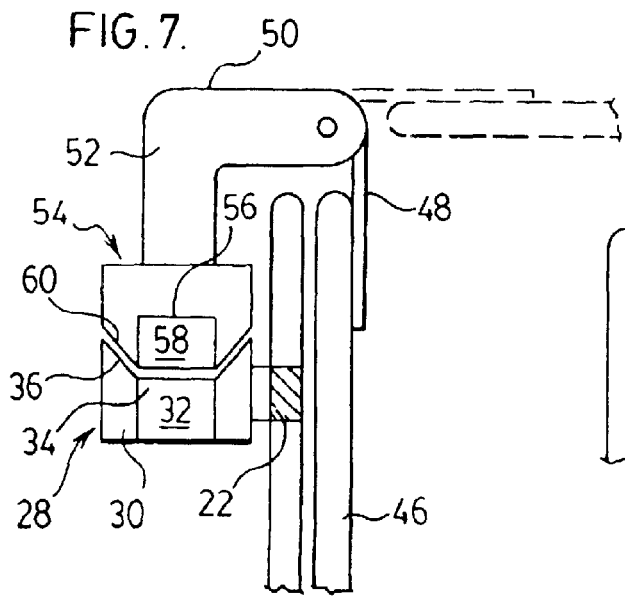
FIG. 7 is a view on the line 77 of Figure on a larger scale.

A pair of housings 28 are provided on the frame 16 adjacent to the temples 24. As shown in FIG. 3, the housings 28 are located behind the pedestals 22 so as not to be seen from the front. The housing 28 is shown in greater detail in FIG. 7 and includes an annular collar 30 that encompasses a magnet 32. The magnet 32 has one of its surfaces 34 exposed and a flange 36 on the collar 30 extends about the periphery of the magnet 32.

An auxiliary lens assembly 40 similarly comprises a pair of auxiliary lenses 42, 44 contained within a frame 46. The frame 46 includes a pair of wings 48 that project upwardly in the temple regions of the frames 46. A pair of arms 50 are secured to the wings 48 and extend rewardly from the frame 46. As again, can be best seen in FIG. 7, each of the arms 50 extends from the wing 48 to the housing 28 and has an elbow indicated at 52 intermediate its ends. The distal end of the arm 50 remote from the wing 48 has a housing 54 with a recess 56 to accommodate a second magnet 58. A lower face 60 of the housing 54 abuts the flange 36 when the magnets 58, 32 are in engagement.

Figure 8:
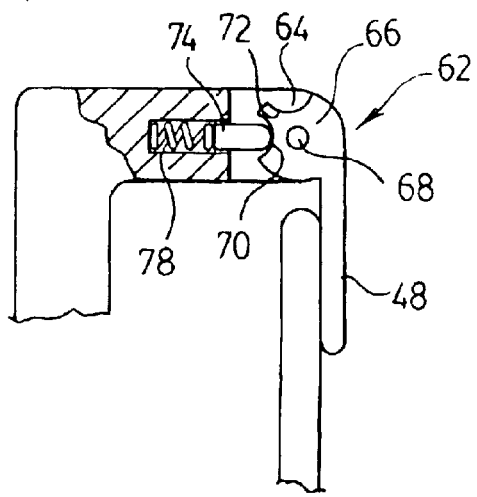
FIG. 8 is a view similar to FIG. 7 partly in section.

The arm 50 is secured to the wing 48 through a hinge 62 shown in FIG. 8. The hinge 62 includes a slot 64 formed at one end of the arm 50. A hinge body 66 formed at the end of the wing 48 is located in the slot 64 and secured for pivotal movement by a hinge pin 68. The hinge body 66 has a pair of recesses 70, 72 that is shaped to receive the curved end of a pin 74. The pin 74 is slidable in a bore 76 in the arm 50 and biased by a spring 78 into engagement with the hinge body 66. The pin 74 thus provides a detent by co-operation with the recesses 70, 72 that biases the hinge to one of two positions.

In use, the auxiliary lens assembly is attached to the spectacles 46 by aligning the magnets 58 and 32. The magnets provide a retaining force to hold the auxiliary lens assembly 46 on the spectacles 10. In the position shown in solid lines of FIG. 7, the auxiliary lenses 42, 44 are positioned to cover the primary lenses 12, 14 respectively and therefore provide additional protection to the user. When the protection is no longer needed, the auxiliary lens assembly 46 may be rotated relative to the arm 50 about the hinge 62.

As the auxiliary lens assembly 46 is rotated, the pin 74 is moved against the bias of the spring 78 and out of the recess 70. It then assists the continued rotation by entering into the recess 72 to hold the auxiliary lens assembly 46 in the position shown in chain dot lines in FIG. 7. During this rotation, a couple is applied to the arm 50 which is resisted by the retaining forces provided by the magnets 58, 32. The resistance to movement provided by the detent in the hinge 62 is less than the retaining force provided between the magnets 58, 32 so that the arm 50 remains in a stable position.

The stability of the arm is enhanced by the abutment between the flange 36 and the lower face of the housing 54. The radial extent of the flange and face increases the resistance to separation of the magnets 58, 32 as a couple is applied to the arm 50. The inclined flanks of the flange and face also provide radial location for the arm 50 relative to the housing 28 to resist shear forces between the magnet 58 and 32. Accordingly, a stable attachment between the auxiliary lens assembly 46 and the spectacles 10 is obtained. It will however be appreciated that where sufficient magnetic force is provided, the provision of a flange is not essential, and, where a flange is used is may be flush with the magnets rather than providing lateral location.

Figure 9:
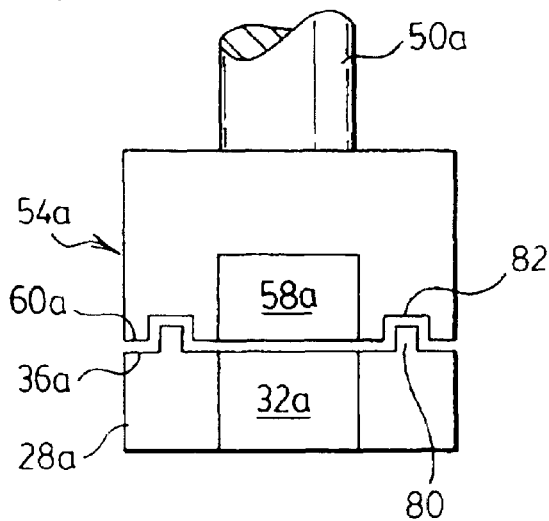
FIG. 9 is a detailed view of a first alternative embodiment to the arrangement shown in FIG. 7.

As shown in FIG. 9, in which like reference numerals will be used to denote like components with a suffix a added for clarity, an alternative configuration of housing 28a and housing 54a may be utilised. In the embodiments shown in FIG. 9, the magnet 32a, 58a are encompassed by the flange 36a and the face 60a respectively. The flange 36a and face 60a are planar with an annular upstanding ridge 80 provided on the flange 36a. A corresponding recess 82 is formed in the face 60a and the inter-engagement of the ridge 80 and recess 82 provides lateral location for the two housings but also provides a mechanical interference against tipping of the arm 50a during movement of the auxiliary lens assembly. This further enhances the stability of the connection.

Figure 10:
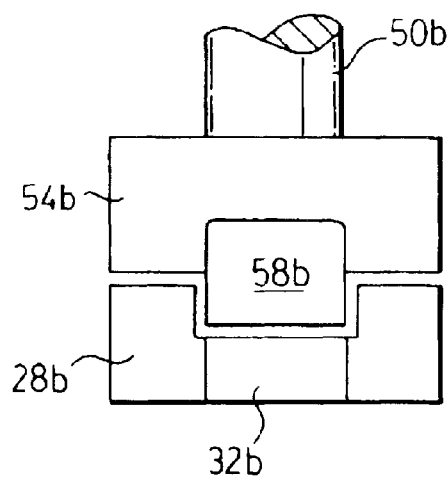
FIG. 10 is a view similar to FIG. 9 of a second alternative embodiment to that shown in FIG. 7.

A similar arrangement is shown in FIG. 10 in which like components will be identified by like reference numerals with a suffix b added for clarity. In the embodiment of FIG. 10, the magnet 58b projects from the end face of the housing 54b and the magnet 32b is recessed in the housing 28b. Accordingly, lateral displacement between the arm 50b and the housing 28b is inhibited and tipping of the arm 50b relative to the housing is also inhibited due to the mechanical interference between the inter-engagement of the magnet 58b and the walls of the housing 28b.

Figure 11:
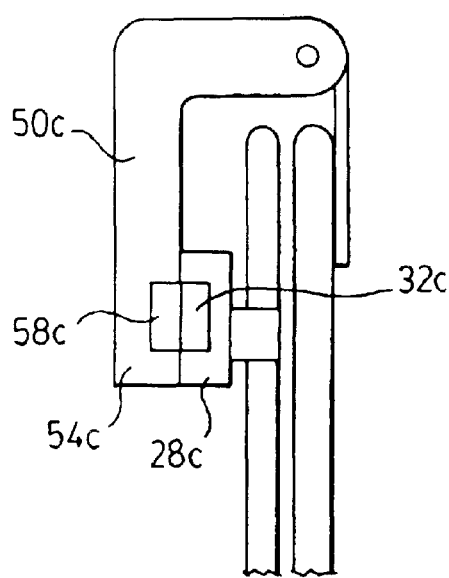
FIG. 11 is a side view similar to FIG. 7 of an alternative configuration.

In each of the above arrangements, the exposed faces of the magnets 32, 58 are disposed normal to the plane containing the primary lenses 12, 14, i.e. they are generally horizontal when worn. In the embodiments shown in FIG. 11, the housing 28c and 54c are disposed such as the exposed faces of the magnets 32c, 58c are parallel to the plane containing the primary lenses 12, 14. Thus the arm 50c depends downwardly behind the pedestal 22c with the magnet 58c facing forwardly to engage the rearwardly directed face of the magnet 32c. As will be appreciated, the flange provided in each housing enhances the stability and, the mechanical interconnection described above with respect to FIGS. 7, 9 and 10 may also be incorporated in this arrangement.

Figure 12:
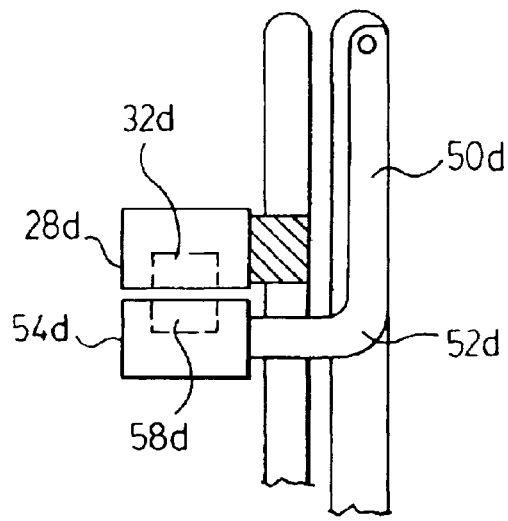
FIG. 12 is a view similar to FIG. 7 of a further alternative configuration.

The arm 50d may also be arranged as shown in FIG. 12 to present the housing 54d to the underside of the housing 28d rather than to the top of the housing as shown in the previous embodiments. En this case, the magnet 32d is disposed with its exposed face downwardly directed and tie magnet 58d disposed with its exposed face upwardly directed. The arm 50d extends parallel to the frame of the auxiliary lens assembly 46 with the elbow 52d located beneath the pedestal 22d. Again, the magnets may be arranged to be flush with the surfaces of the housings 54d, 28d or may incorporate the mechanical interaction shown in FIGS. 7, 9 and 10 and described above.

In each of the above embodiments, the magnetic connection between the auxiliary frame 50 and the primary 12 is located at the temple region. In a further set of embodiments shown in FIGS. 33 through 26, an alternative arrangement is utilised in which the bridge is used to retain the auxiliary frame and accommodate the relative movement.

Referring therefore to FIG. 13, the eyeglasses 10e are provided with a main frame 12e with lens openings 14e and 16e respectively. A bridge 18e connects the frames defining the lens openings and side arms 24e extend rearwardly from the temple region of the primary frame 12e.

The auxiliary frame 50e similarly has a pair of lens opening 52e, 54e interconnected by a bridge 56e. The lens opening 52e, 54e are defined by the main frame member 64e.

In order to secure the auxiliary frame 50e to the main frame 12e, a sub frame 130 is utilised. The sub frame 130, which is best seen in FIG. 14, has a pair of arms 132, 134 projecting outwardly from a bridge member 136. The arms 132, 134 conform to the shape of an upper portion of the main frame 12e and each terminates in a hinge for connection to the auxiliary frame 50e.

The arm 132 terminates in a pin 138 that is received within a tubular sleeve 140 secured to the main frame 64e of the auxiliary lenses 50e. The arm 134 terminates in a threaded boss 142 that is aligned with a sleeve 144 secured to the main frame 64e. A bolt 148 passes through a spring 146 and the sleeve 144 and is retained in the bush 142. The end faces of the bush 144 and sleeve 142 are contoured to provide a pair of detents, each of which holds the frame 50e in a stable position. Thus, the auxiliary frame 50e may pivot relative to the sub frame 130 and be retained in one of a pair of stable positions.

The bridge member 136 has a pair of magnets 150 projecting downwardly below the bridge member 136. The magnets 150 are received in a pair of sockets 152 formed in the bridge 18p. The sockets 152 pass through the bridge member as can be seen in FIG. 15 and the bridge member 18e is made from a magnetic material. The magnets 150 thus retain the bridge member 136 on the bridge 18e to secure the sub frame 130 on the main frame 10e.

In operation therefore, the sub frame 130 may be secured to the bridge 18e with the auxiliary frame 50e projecting upwardly as shown in FIG. 33. In this position, the auxiliary lenses 52e, 54e are out of the line of vision of the user and are held in a stable position. When the shade provided by the auxiliary lens is required, the auxiliary frame 50e is rotated relative to the sub frame 130 to cause the lenses 52e, 54e to overlie the main lenses 14e, 16e. The auxiliary frame 50e is maintained in a stable position relative to the main frame to provide the shade.

Figure 16:
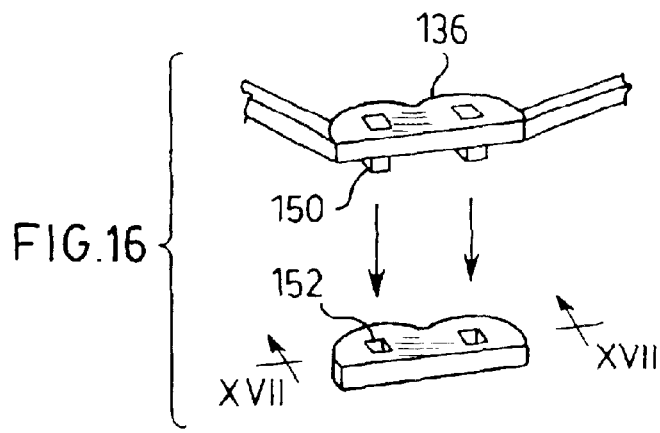
FIG. 16 is a view similar to FIG. 14 of an alternative embodiment.
Figure 17:
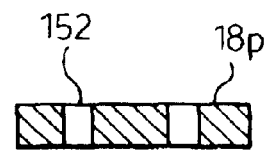
FIG. 17 is a view on the line XVII—XVII of FIG. 16.
Figure 18:
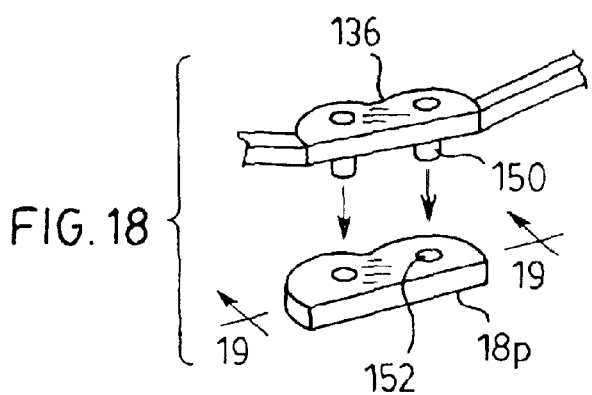
FIG. 18 is a view similar to FIG. 16 of a still further embodiment.'
Figure 19:
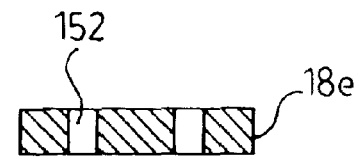
FIG. 19 is a view on the line 19—19 of FIG. 18.
Figure 20:
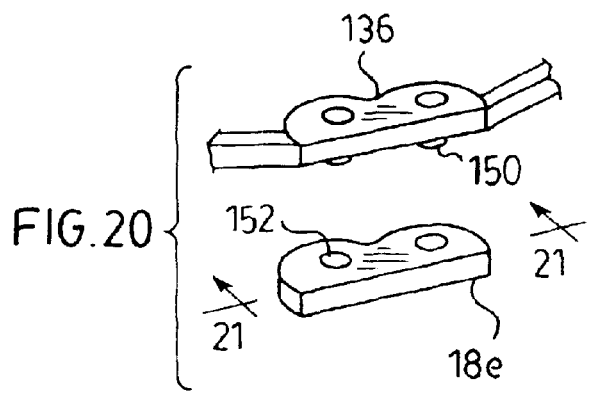
FIG. 20 is a view similar to FIG. 18 of a still Her embodiment.
Figure 21:
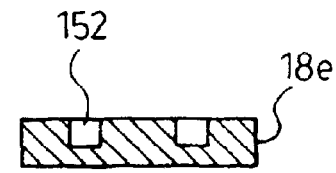
FIG. 21 is a view on the line 21—21 of FIG. 20.

In the embodiments shown in FIGS. 14 and 15, the sockets 152 pass through the bridge 18e. Alternatively, as shown in FIGS. 16 and 17, the sockets 152 do not pass through the bridge 18e to provide a solid base to retain the magnet. The magnets 150 are received in the sockets 152.

Figure 22:
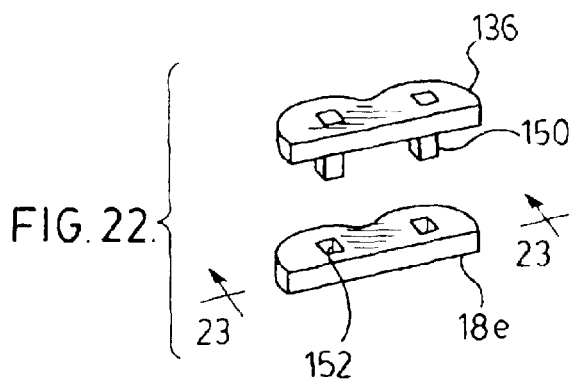
FIG. 22 is a view similar to FIG. 20 on a yet further embodiment.
Figure 23:
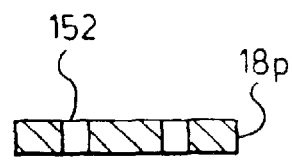
FIG. 23 is a view on the line 23—23 of FIG. 22.
Figure 24:
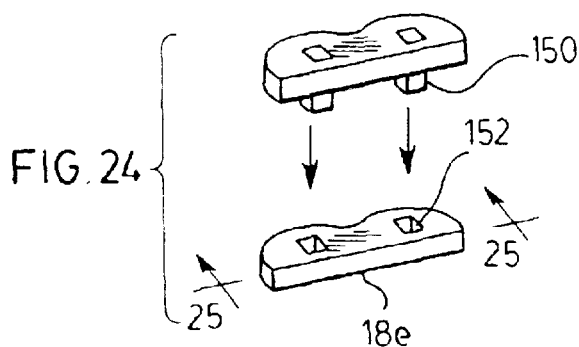
FIG. 24 is a view similar to FIG. 22 of a further embodiment.
Figure 25:
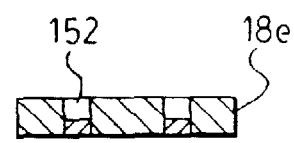
FIG. 25 is a view on the line 25—25 of FIG. 24.

In the embodiment of FIG. 16, the magnets are a square cross section but as shown in FIGS. 18 and 19 and FIGS. 20, and 21 the magnets way be an alternate cross section such as circular, as shown in those Figures.

Where the material of the bridge 18e is not magnetic, attraction between the sub frame 130 and the bridge 18e may be obtained by the insertion of magnets 154 at the lower end of the sockets 152. The magnets 150 thus engage the magnets 154 to retain the sub frame on the bridge. In the arrangement shown in FIGS. 22 and 23, the magnets 150 and sockets 152 are square in cross section whereas as shown in FIGS. 24 and 25, the magnets are circular in cross section.

Figure 26:
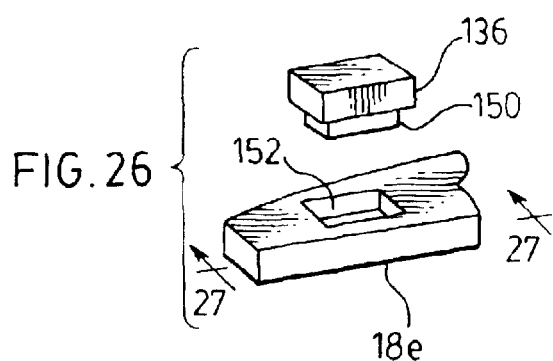
FIG. 26 is a view similar to FIG. 24 of a further embodiment.
Figure 27:
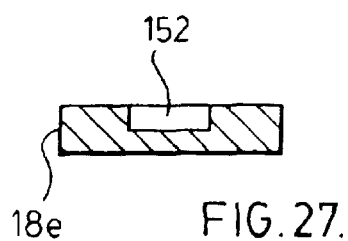
FIG. 27 is a view on the line 27—27.

In the above embodiments, a pair of magnets 152 have been utilised but as shown in FIGS. 26 and 27 a single magnet may be utilised. In this case, the bridge 18e is formed from magnetic material and has a socket 152 formed centrally in the upper surface. A square section magnet 150 depends from the bridge member 136 to secure the auxiliary frame 50e to the main frame.

In each of the above embodiments the sub frame 130 permits the pivotal movement of the auxiliary frame between the first position in which the lenses are shaded and a second position in which the auxiliary lenses are maintained out of the line of vision.

The embodiments of the invention in which an exclusive property or privilege is claimed are defined as follows:

1. An auxiliary lens assembly for use with a pair of spectacles having a pair of primary lenses, said assembly having a pair of auxiliary lenses interconnected to one another by a bridge, a subframe connected at one end to said auxiliary lens and having a magnetic member at an opposite end for connection to a magnetic member on said spectacle and thereby locate said assembly on said spectacles, said subframe including a hinge to permit movement of said assembly between a first position in which said auxiliary lenses cover said primary lenses to a second position in which they do not cover said primary lens, said hinge including a retainer to hold said assembly in either said first or second position.

2. An auxiliary lens assembly according to claim 1 wherein said retainer is a detent to bias said assembly to either said first or second position.

3. An auxiliary lens assembly according to claim 1 wherein said subframe includes a pair of arms, each pivotally connected to a respective one of said auxiliary lenses and a magnetic member is secured in a housing located at one end of each of said arm, and configured to inhibit relative movement between said arm and said spectacle.

4. An auxiliary lens assembly according to claim 1 wherein said magnetic member is a magnet.

5. Eyeglasses comprising a pair of spectacles having a pair of primary lenses interconnected by a bridge and a pair of temples pivotally connected to said primary lenses for retaining said spectacles on a user, a first magnetic member located on said spectacles, an auxiliary lens assembly having a pair of auxiliary lenses interconnected to one another by a bridge, a second magnetic member secured to said auxiliary lens assembly and positioned to co-operate with said first magnetic member to retain said auxiliary lens assembly on said spectacles, a hinge between said spectacles and said auxiliary lens assembly to permit said auxiliary lens assembly to move whilst secured to said spectacles between a first position in which said primary lenses are covered by said auxiliary lenses and a second position in which said auxiliary lenses do not cover said primary lenses said hinge including a retainer to maintain said assembly in either said first or second positions.

6. Eyeglasses according to claim 5 wherein a pair of arms are provided at spaced locations, each of said arms having one of said magnetic members carried thereby for co-operation with the other of said magnetic members.

7. Eyeglasses according to claim 6 wherein said arms are secured to said auxiliary lens assembly and said second magnetic member is located at a distal end thereof, said spectacles having corresponding spaced first magnetic members for co-operation therewith.

8. Eyeglasses according to claim 7 wherein each of said arms includes a hinge to permit movement between said first and second positions.

9. Eyeglasses according to claim 7 wherein each of said first magnetic members are located in a respective housing secured to said spectacles adjacent said temples.

10. Eyeglasses according to claim 9 wherein each of said housings includes a flange at least partially encompassing said first magnetic member.

11. Eyeglasses according to claim 10 wherein said housings support said magnetic member with a surface thereof exposed for abutment with an exposed surface of said second magnetic member carried by a respective one of said arms.

12. Eyeglasses according to claim 11 wherein said exposed surface lies in a plane generally normal to a plane containing said primary lenses.

13. Eyeglasses according to claim 12 wherein said exposed surface lies in a plane generally parallel to the pivotal axis defined by said hinge.

14. Eyeglasses according to claim 11 wherein said exposed surface lies in a plane generally parallel to a plane containing said primary lenses.

15. Eyeglasses according to claim 11 wherein said second magnetic members are located in a housing at a distal end of respective areas of said arms and each of said housings has an end face to co-operate with said flange on said spectacle.

16. Eyeglasses according to claim 15 wherein each of said arms includes a hinge to permit movement between said first and second positions.

17. Eyeglasses according to claim 5 wherein said retainer is a detent biasing said hinge to either said first or second positions.

18. Eyeglasses comprising a primary frame and a pair of temples extending from said frame at spaced locations, and an auxiliary frame detachably secured to said primary frame by a pair of arms extending rearwardly from said auxiliary frame and secured to a housing located behind said primary frame and adjacent said temples, each of said arms including a hinge to permit said auxiliary frame to move from a first orientation in which said auxiliary frame overlies said primary frame to a second orientation in which said auxiliary frame is disposed away from the optical axis of lenses carried by said primary lens said arm extending beneath said temple and engage said housing.

19. Eyeglasses according to claim 18 wherein said arms are secured to said housing by magnets.

20. Eyeglasses according to claim 19 wherein said magnets engage said housing in a horizontal plane.

21. Eyeglasses according to claim 20 wherein said magnets engage said housing in a vertical plane.

22. Eyeglasses comprising a primary frame and a pair of temples extending from said frame at spaced locations, and an auxiliary frame detachably secured to said primary frame by a pair of arms extending rearwardly from said auxiliary frame and secured to a housing located behind said primary frame and adjacent said temples, each of said arms including a hinge to permit said auxiliary frame to move from a first orientation in which said auxiliary frame overlies said primary frame to a second orientation in which said auxiliary frame is disposed away from the optical axis of lenses carried by said primary lens, said arms extending above said temple regions and terminating in a magnetic member for connection of said arms to housing by magnetic attraction, said magnetic members engaging said housing in a horizontal plane.

23. Eyeglasses according to claim 22 wherein said housing and arms have interengaging formations to locate said arms relative to said housing.

24. Eyeglasses according to claim 23 wherein a recess is formed in one of said housing and arm to receive a projection on the other thereof.

25. Eyeglasses according to claim 24 wherein said recess is frustoconical.

26. Eyeglasses according to claim 24 said recess is an annular groove formed in said one of said housing and arm and said projection is an annular rib formed on the other thereof.

27. Eyeglasses comprising a primary frame and a pair of temples extending from said frame at spaced locations, and an auxiliary frame detachably secured to said primary frame by a pair of arms extending rearwardly from said auxiliary frame and secured to a housing located behind said primary frame and adjacent said temples, each of said arms including a hinge to permit said auxiliary frame to move from a first orientation in which said auxiliary frame overlies said primary frame to a second orientation in which said auxiliary frame is disposed away from the optical axis of lenses carried by said primary lens, said housings and arms have interengaging formations to locate said arms relative to respective ones of said housing.

28. Eyeglasses according to claim 27 wherein a recess is formed in one of said housing and arm to receive a projection on the other thereof.

29. Eyeglasses according to claim 28 wherein said recess is frustoconical.

30. Eyeglasses according to claim 28 wherein said recess is an annular groove formed in said one of said housing and arm and said projection is an annular rib formed on the other thereof.

31. An auxiliary lens assembly for use with a pair of spectacles having a pair of primary lenses, said assembly having a pair of auxiliary lenses interconnected to one another by a bridge, a subframe connected at one end to said auxiliary lens and having a magnetic member at an opposite end for connection to a magnetic member on said spectacle and thereby locate said assembly on said spectacles, said subframe including a hinge to permit movement of said assembly between a first position in which said auxiliary lenses cover said primary lenses to a second position in which they do not cover said primary lenses, said subframe including a pair of arms at spaced location and extending rearwardly from said auxiliary frame to terminate in a magnetic member, each of said arms having an engagement surface oriented in a horizontal plane in use to connect said auxiliary lens assembly to the spectacles by magnetic forces.

32. An auxiliary lens assembly according to claim 31 wherein said subframe is L shaped with an elbow intermediate its ends.

33. An auxiliary lens assembly according to claim 32 wherein said hinge is located at one end of said subframe.

34. An auxiliary lens assembly according to claim 33 wherein each of said auxiliary lenses is located in a frame and said subframe is connected to said frame at said hinge.

35. An auxiliary lens assembly according to claim 34 wherein said magnetic member is a magnet.

36. An auxiliary lens assembly according to claim 31 wherein said horizontal surface is directed upwardly in use.

37. An auxiliary lens assembly according to claim 31 wherein said horizontal surface is directed downwardly in use.

38. An auxiliary lens assembly according to claim 31 wherein said magnetic member is located in a housing and a flange extends about said magnetic member to provide said engagement surface.

39. An auxiliary lens assembly for use with a pair of spectacles having a pair of primary lenses, said assembly having a pair of auxiliary lenses interconnected to one another by a bridge, a subframe connected at one end to said auxiliary lens and having a magnetic member at an opposite end for connection to a magnetic member on said spectacle and thereby locate said assembly on said spectacles, said subframe including a hinge to permit movement of said assembly between a first position in which said auxiliary lenses cover said primary lenses to a second position in which they do not cover said primary lenses, said sub frame including a pair of arms at spaced location and extending rearwardly from said auxiliary frame to terminate in a magnetic member, each of said anus having an engagement surface configured to inhibit relative lateral movement between said auxiliary lens assembly to the spectacles.

40. An auxiliary lens assembly according to claim 39 wherein said engagement surface is formed as a frustoconical surface.

41. An auxiliary lens assembly according to claim 39 wherein said engagement surface is formed as an annular rib.

\* \* \* \* \*